United States Patent
Tach et al.

(10) Patent No.: US 8,992,714 B2
(45) Date of Patent: Mar. 31, 2015

(54) METHOD FOR PRODUCING AN ADHESIVE TAPE HAVING A PROTRUDING LINER

(75) Inventors: Michael Tach, Hamburg (DE); Bruce Dirk Ehlers, Hamburg (DE); Markus Gabriel, Hamburg (DE); Christian Fröhlich, Henstedt-Ulzburg (DE)

(73) Assignee: tesa SE, Hamburg (DE)

( * ) Notice: Subject to any disclaimer, the term of this patent is extended or adjusted under 35 U.S.C. 154(b) by 192 days.

(21) Appl. No.: 13/814,660

(22) PCT Filed: Aug. 1, 2011

(86) PCT No.: PCT/EP2011/063226
§ 371 (c)(1),
(2), (4) Date: Apr. 15, 2013

(87) PCT Pub. No.: WO2012/019938
PCT Pub. Date: Feb. 16, 2012

(65) Prior Publication Data
US 2013/0206327 A1    Aug. 15, 2013

(30) Foreign Application Priority Data

Aug. 13, 2010 (DE) .......................... 10 2010 039 299
Apr. 28, 2011 (DE) .......................... 10 2011 017 689

(51) Int. Cl.
| B32B 38/04 | (2006.01) |
| B32B 37/00 | (2006.01) |
| B32B 38/10 | (2006.01) |
| C09J 7/00 | (2006.01) |
| C09J 7/02 | (2006.01) |

(52) U.S. Cl.
CPC . B32B 38/10 (2013.01); C09J 7/00 (2013.01); C09J 7/02 (2013.01); C09J 7/0232 (2013.01)
USPC ........... 156/265; 156/152; 156/247; 156/248; 156/249; 156/259; 156/264; 156/271; 156/289; 156/297; 156/299; 156/302; 156/324; 428/41.7; 428/41.8

(58) Field of Classification Search
USPC ......... 156/259, 271, 297, 299, 300, 301, 264, 156/265, 289, 152, 247–249, 257, 268, 302, 156/324; 428/41.7, 41.8; 427/207.1–208.4
See application file for complete search history.

(56) References Cited

U.S. PATENT DOCUMENTS

| 4,418,105 A * | 11/1983 | Stratton ....................... 428/41.8 |
| 2003/0113500 A1 | 6/2003 | Ingerslew et al. |

FOREIGN PATENT DOCUMENTS

| DE | 2906284 A1 | 8/1980 |
| DE | 9011568 U1 | 11/1990 |
| DE | 10135180 A1 | 2/2003 |
| DE | 102009010045 A1 | 9/2010 |
| EP | 0928822 A1 | 7/1999 |

OTHER PUBLICATIONS

International Search Report for PCT Application No. PCT/EP2011/063226 dated Aug. 28, 2012.
German Office Action for German Application No. DE 10 2010 039 299.5 dated Nov. 23, 2010.
Satas, Donatas, "Coating Equipment", "Handbook of Pressure Sensitive Adhesive Technology", 1999, pp. 896-936, Third Edition, Satas & Associates, Warwick, Rhode Island.

* cited by examiner

Primary Examiner — John Goff
Assistant Examiner — Carson Gross
(74) Attorney, Agent, or Firm — Norris McLaughlin & Marcus, P.A.

(57) ABSTRACT

A method produces adhesive tapes which are adhesive at least on one side, wherein an adhesive tape web, in which the at least one adhesive side is covered by a first liner, is guided into a cutting device in which a total of N individual adhesive tape strips located next to one another are produced in the machine direction from the adhesive tape web. Every other adhesive tape strip is removed from the first liner and is applied to a second liner in each case having a spacing a between the individual adhesive tape strips. The liners are cut between the adhesive tape strips located on the first liner and on the second liner, and the individual adhesive tapes, together with the liner strips, are wound up in a total of X rolls in a form of an Archimedean spiral.

6 Claims, 3 Drawing Sheets

METHOD FOR PRODUCING AN ADHESIVE TAPE HAVING A PROTRUDING LINER

Figure 1:
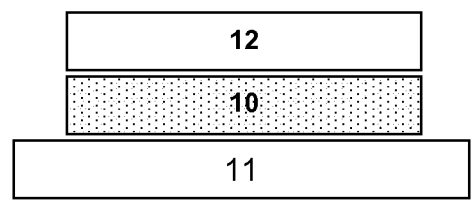

This is a 371 of PCT/EP2011/063226 filed 1 Aug. 2011 (international filing date), and claims the priority of German Application Nos. 10 2010 039 299.5, filed 13 Aug. 2010, and 10 2011 017 689.6, filed 28 Apr. 2011.

The invention relates to a process for producing an adhesive tape with protruding liner.

Adhesive tapes coated with adhesives on one or both sides are mostly wound up to give a roll in the form of an Archimedean spiral at the end of the production process. Prior to the winding process, the adhesive tapes are applied to a protective covering material (also termed release material) which is wound up together with the adhesive tape, with the aim, in the case of adhesive tapes that are adhesive on both sides, of preventing the (pressure-sensitive) adhesive masses from coming into contact with one another or, in the case of adhesive tapes that are adhesive on one side, of preventing adhesion of the (pressure-sensitive) adhesive mass on the backing. Protective covering materials of this type are known to the person skilled in the art as release liners or liners. Liners are used not only for the protective covering of adhesive tapes that are adhesive on one or both sides but also for the protective covering of labels.

A liner (release paper, release film) is not a constituent of an adhesive tape or label, but instead is merely an aid to production or storage of these, or for further processing via punching. Furthermore, a liner differs from an adhesive tape backing in lacking strong bonding to an adhesive layer.

When an adhesive tape that is adhesive on both sides and has been equipped with a liner is unrolled, the normal procedure is that its open, i.e. liner-free pressure-sensitive adhesive mass side is adhesive-bonded to a substrate. During this procedure, the other pressure-sensitive adhesive mass side continues to adhere on the coated surface of the liner to an extent that is sufficient to permit handling of the adhesive tape.

The liner can be peeled from the adhesive tape, and in this context the liner itself or the peeling of the liner should not significantly impair the bond strength of the adhesive mass for subsequent use.

The usual method when producing liners is that the paper- or film-based backings are equipped with an antiadhesive coating (release coating) in order to reduce the tendency of the adhesive mass to adhere to these surfaces. It is preferable that both sides are subjected to this process.

Crosslinkable silicone systems are often used as release coating. Among these are mixtures made of crosslinking catalysts and of what are known as heat-curable condensation- or addition-crosslinking polysiloxanes. For condensation-crosslinking silicone systems, tin compounds are often present as crosslinking catalysts in the composition, an example being dibutyltin diacetate.

The term liner is used hereinafter both for the protective covering material and for the release material.

A problem with many liners is difficulty that these are difficult to separate from the adhesive mass to which they provide protective covering. Said problem is particularly apparent when the width of the liner is the same as the width of the adhesive mass to which protective covering is provided, and the liner does not therefore protrude. It can then be difficult to obtain grip on at least a section of the liner, for the purposes of peeling.

Problem-free removal of a liner can be essential in particular when the adhesive tapes with their protective covering are further processed through machinery.

Easier handling of adhesive mass/liner combinations of this type is provided by applying liners of width greater than that of the adhesive mass that requires protective covering. This gives a protruding liner which permits better peeling of the liner from the adhesive mass, because the protruding region of the liner serves as area available for grip.

Another problem of many adhesive tape rolls is solved simultaneously, namely lateral edge tack. When the flat sides of adhesive tape rolls are placed on a substrate, adhesive bonding to the substrate of the roll can occur as a result of the contact between adhesive mass and substrate. Another possible result of this lateral edge tack, particularly in the case of adhesive mass layers that are thick or have high tack, is that the wound layers of the adhesive tape roll become adhesive-bonded to one another, and that it therefore becomes impossible to unwind the adhesive tape from the roll. A high level of lateral edge tack can also hinder the transport and storage of the adhesive tape roll, if the roll is transported or stored while lying on its side without any antiadhesive interlay sheet.

A protruding liner provides a solution for the disadvantages described. It prevents contact between two adjacent adhesive layers and provides a spatial distance between the side of the adhesive roll and a substrate. Another result is that the interlay sheet becomes superfluous.

Adhesive tapes that are adhesive on one side are usually composed of a backing material to which an adhesive mass has been applied on one side. The free side of the adhesive mass can then additionally have been protectively covered with a liner.

Adhesive tapes that are adhesive on both sides mostly have a backing equipped with an adhesive mass coating on both sides. The two adhesive masses can be identical, but they can also be different. A liner protectively covers at least one of the two adhesive mass layers, in order to prevent direct contact between the two adhesive mass layers in the adhesive tape roll. Alongside this, there can also be a second liner protectively covering the second adhesive mass.

It is not essential that adhesive tapes that are adhesive on both sides have a backing. The expression adhesive tapes that are adhesive on both sides is also used for an adhesive mass layer without any other components, or for two or more adhesive mass layers laminated to one another.

FIG. 1 shows an adhesive tape that is adhesive on both sides, where the adhesive tape is composed of an adhesive mass layer 10 without any other components. A first liner 11 protectively covers the underside of the adhesive mass layer, and protrudes beyond both edges of the adhesive mass 10. The upper side of the adhesive mass has been equipped with a second liner 12, the width of which is identical to the width of the adhesive mass 10.

A disadvantage of adhesive tapes with protruding liner is complicated manufacture.

Adhesive tapes are usually produced by unrolling a wide roll of backing material and then equipping this with an adhesive mass. Said adhesive mass can then be protectively covered with a liner. After other processing steps that may be carried out, for example drying, the backing material which has been equipped with adhesive mass and which is termed adhesive tape web is wound up together with liner to give what is known as a stock roll. For the cutting process, the stock roll is unwound and the adhesive tape web protectively covered with a liner is introduced into an appropriate cutting apparatus in which the adhesive tape web is cut up to give individual adhesive tapes. The cutting process can also take place directly after manufacture, i.e. without winding and, in turn, unwinding of the adhesive tape web together with liner.

In another method of producing adhesive tapes, adhesive tape rolls are produced from a jumbo roll or stock roll directly, by a parting process.

It is moreover possible that the adhesive tape web is cut without liner and that the liner is applied at the appropriate width to the open adhesive mass side after the cutting procedure.

If the adhesive tape is composed of an adhesive mass layer without any other components (being what is known as a transfer adhesive tape), i.e. having no backing, said layer is usually applied directly to a liner. In this case, the expression adhesive tape web is used for the uncut adhesive mass layer.

Known processes can be used for the coating and drying process. An overview of conventional production processes is found by way of example in "Coating Equipment", Donatas Satas in Handbook of Pressure Sensitive Adhesive Technology, second edition, edited by Donatas Satas, Van Nostrand Reinhold New York, pages 767 to 808.

The process technology for applying the liner after the cutting of the adhesive tape rolls is complicated because of the need to provide very precise protective covering to a large number of comparatively narrow adhesive tapes by using liner which, although its width is greater than that of the adhesive tapes, is nevertheless narrow.

For each adhesive tape it is necessary to install a separate roll unwind for the protruding liner. A web guiding system and a lamination unit must moreover be provided for each individual adhesive tape. The protruding liners must be cut separately to the correct width and be available on a reel.

As an alternative, when the adhesive tape web equipped with a liner is cut, an additional narrow strip can be removed in the edge region of each individual adhesive tape, without separating the liner situated thereunder at this site. The narrow strip is then removed before the adhesive tape is wound up to give a roll, and a region free from adhesive mass is thus produced at one edge of the adhesive tape. It is also possible to cut and remove narrow strips at both edges of the adhesive tape in such a way that the liner protrudes at both edges of the adhesive tape. A disadvantage of this process is that the adhesive tape becomes narrower and associated with this there is a loss of material.

It is an object of the invention to eliminate the disadvantages of the prior art. A particular intention is to provide a process which can produce an adhesive tape with protruding liner and which uses simple process technology, and which can be operated in such a way that it leads to no losses of adhesive tape.

Said object is achieved via a process as set out in the main claim. The dependent claims provide advantageous embodiments of the process.

Accordingly, the invention provides a process for producing adhesive tapes that are adhesive on at least one side, where
an adhesive tape web in which a first liner protectively covers the at least one adhesive side is conducted into a cutting apparatus in which, in machine direction, a total of N individual adhesive tape strips situated alongside one another are produced from the adhesive tape web in particular without loss, without damage to the first liner,
each second adhesive tape strip is removed from the first liner and is laminated to a second liner with in each case a distance between the individual adhesive tape strips,
in each case a cut is made through the first liner and the second liner, between the adhesive tape strips located on the first liner and on the second liner,
the individual adhesive tapes are wound up with the liner strip to give a total of N rolls in the form of an Archimedean spiral.

The expression damage to the liner means that a cut has been made through the release coating usually provided on the liner, or that the cutting procedure has weakened the liner so severely as to result in severe restriction of mechanical stability, in such a way that the liner can be separated at this site.

Damage to the surface of the release coating due to a cut, or depression of the surface by the cutting tool, does not count as damage, as long as the functionality of the liner is not altered.

The adhesive tape web can be an adhesive mass layer without any other components (where said layer can in turn be composed of one, two, or more adhesive mass layers), a backing material equipped on one side with an adhesive mass, or a backing material equipped on both sides with an adhesive mass, where another liner can additionally provide protective covering to the second adhesive mass in the latter case.

Examples of backing material that can be used in the form of a tape are nonwovens, papers, oriented PP, HDPE, LDPE, PVC, and PET films, and also foams (e.g. PE foams or PVA foams), and textiles, this being a non-exclusive list.

Liners used preferably comprise backing materials with antiadhesive coating on one or both sides, examples being paper, in particular coated paper, such as PE paper, and oriented PP, HDPE, LDPE, PVC, MOPP, BOPP, PEN, PMP, PA, and/or PET films. Particular preference is given to silicone-coated liners, and also to liners which have silicone-free release layers, an example being paraffin, Teflon, or waxes. Composite materials can also be used as liners, an example being PET/aluminum foil.

Adhesive mass used can comprise any of the known adhesive masses, for example adhesive masses based on solvent-containing natural rubber and acrylate adhesive masses, or solvent-free adhesive masses.

The expression "cutting" also subsumes punching processes.

The process is preferably carried out continuously.

Advantageous embodiments of the process are described by using the figures described in more detail below, but neither these embodiments nor the figures themselves are to be interpreted as restricting.

Figure 2:
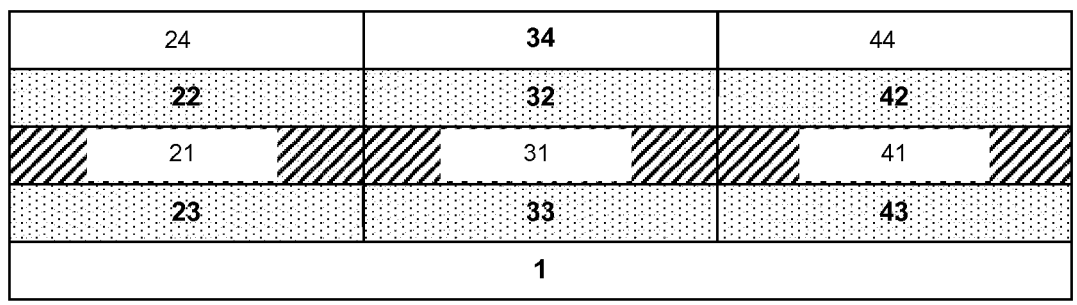

FIG. 2 shows a possible starting material intended for processing by the process of the invention, or on which the first step of the process has already been carried out. The usual method is to cut a very large number of individual strips of adhesive tape from one adhesive tape web. FIG. 2 shows only three individual adhesive tape strips 2, 3, 4 thereof situated alongside one another, having been cut, in machine direction, in a cutting apparatus from an adhesive tape web, without loss. The location of the adhesive tape web and therefore of the adhesive tape strips 2, 3, 4 is on a first liner 1, which has not been damaged during the cutting procedure for the adhesive tape strips 2, 3, 4.

The individual adhesive tape strips are composed of a backing material 21, 31, 41 equipped on both sides with an adhesive mass 22, 32, 42, 23, 33, 43, where the upper adhesive mass layer 23, 33, 43 was protectively covered with another liner which had likewise been separated in the cutting process, in such a way that in each case a liner section 24, 34, 44 protectively covers the entire surface of the upper adhesive mass layer 23, 33, 43.

Figure 3:
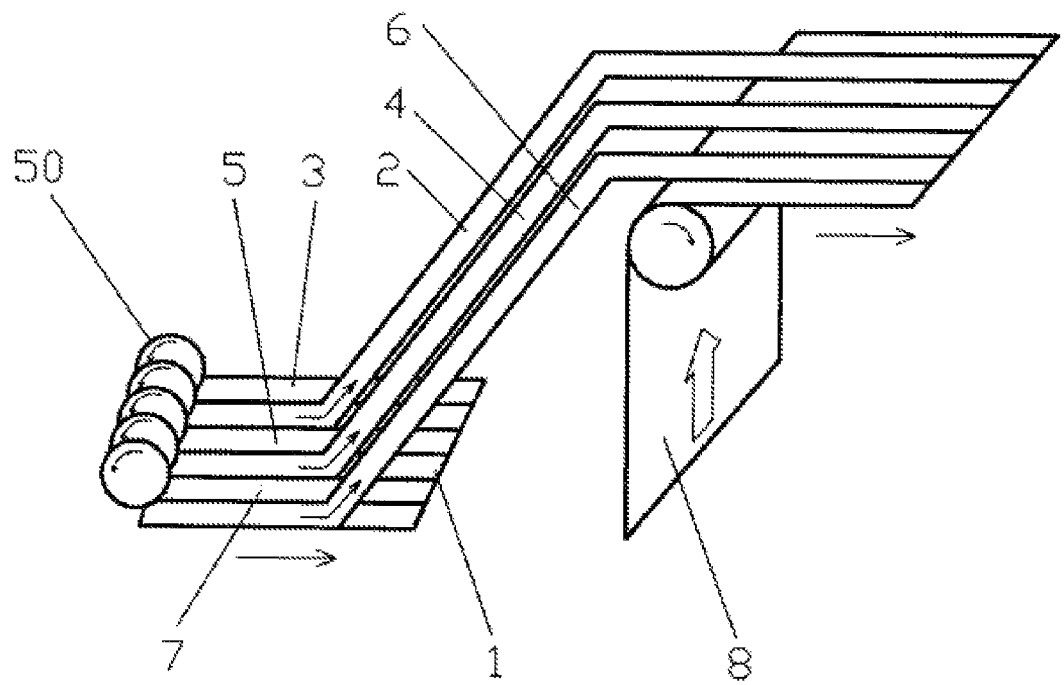

FIG. 3 shows an adhesive tape web where six adhesive tape strips 2, 3, 4, 5, 6, 7 have been produced in a cutting apparatus 50.

After the cutting process, each second adhesive tape strip 2, 4, 6 is removed from the first liner 1 and laminated to a second liner 8, where the distances between the adhesive tape strips 2, 4, 6 remain unaltered.

The remaining adhesive tape strips 1, 3, 5 remain on the first liner 1.

It is also possible, of course, to remove the adhesive tape strips 3, 5, 7 from the first liner 1 and to laminate these to the second liner 8, while the adhesive tape strips 2, 4, 6 remain on the first liner 1.

The liners 1, 8 together with the adhesive strips 2, 3, 4, 5, 6, 7 can then be wound up to give rolls in a further step of the process. Said rolls would then in turn be unwound from the roll prior to further processing.

The liners 1, 8 can also be introduced directly into another cutting apparatus. In said cutting apparatus, in each case a cut is made through the first liner 1 and the second liner 8, between the adhesive tape strips 2, 3, 4, 5, 6, 7 located on the first liner 1 and on the second liner 8.

The cut through the liners 1, 8 is preferably made in such a way that the distance a between the adhesive tape strips 2, 3, 4, 5, 6, 7 is in each case precisely bisected.

In another embodiment of the invention, the cut through the liners 1, 8 is made in such a way that in each case the liners are separated directly at a lateral edge of the adhesive tapes 2, 3, 4, 5, 6, 7. The liner thus protrudes (i.e. is wider) at one edge of the adhesive tape.

Mixed forms of the two variants are, of course, also possible.

The cut through the liners can generally be adjusted in a controlled manner in such a way that the protrusion of the liner at the two edges of the adhesive tape can be adjusted as desired.

If, in addition, the width of the first liner 1 is greater than that of the adhesive tape web, in such a way that the first liner 1 protrudes at both sides of the adhesive tape web, and if the adhesive tape strips 2, 4, 6 are laminated on the second liner 8 in such a way that the two outer adhesive tape strips 2, 6 are not in direct contact with the edge of the liner, but instead the liner 8 also protrudes in each case at the outer edge of the adhesive tape strips 2, 6, the cutting process gives adhesive tape strips 2, 3, 4, 5, 6, 7 in which the liner protrudes at both sides, in such a way as to permit very effective gripping of said protrusions and to permit completely problem-free removal of said liner from the adhesive mass situated thereunder.

Figure 4:
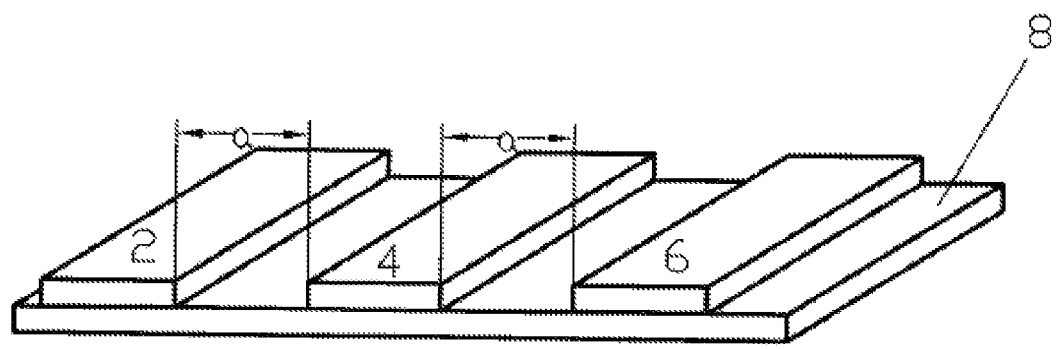
Figure 5:
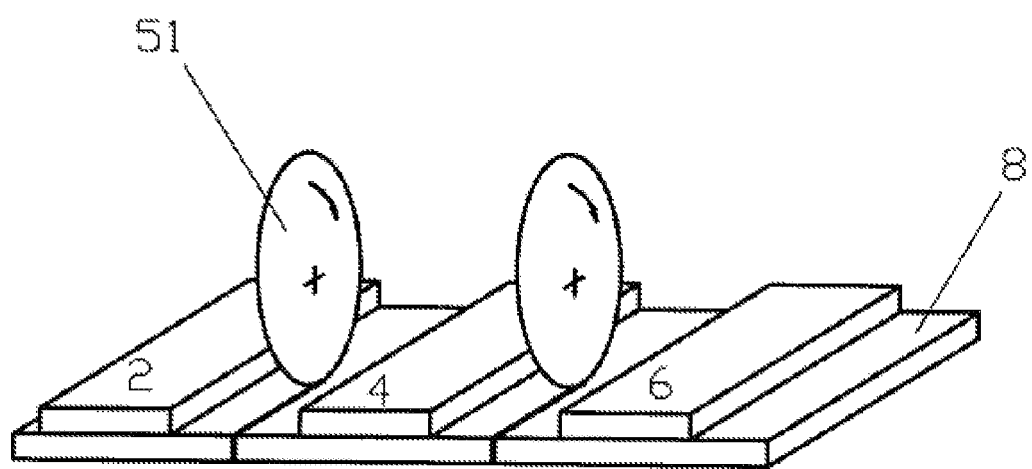

FIG. 4 shows the second liner 8, to which the three adhesive tape strips 2, 4, 6 have been laminated. A cut is made through said liner in the cutting apparatus 51, in such as a way as to produce three individual adhesive tapes.

The cutting procedure is in particular a longitudinal cutting process using the blade-cut method, crush-cut method, or scissor-cut method, cutting centrally in the region free from adhesive mass. Individual adhesive tape strips are produced.

Finally, the individual adhesive tapes with the liner strips are wound up to give a total of six rolls in the form of an Archimedean spiral, where the protective covering paper on each individual adhesive tape protrudes.

A great advantage of the process of the invention is that the process can be operated without any loss of sections of adhesive tape.

The invention nevertheless covers situations where this advantage is not utilized and by way of example a narrow strip is additionally removed from the adhesive tapes prior to wind-up of the adhesive tape into a roll.

What is claimed is:

1. A process for producing adhesive tapes that are adhesive on at least one side, where an adhesive tape web in which a first liner protectively covers the at least one adhesive side is conducted into a cutting apparatus in which, in machine direction, a total of N individual adhesive tape strips situated alongside one another are produced from the adhesive tape web without loss and/or without damage to the first liner,
    each second adhesive tape strip, or each third adhesive tape strip, is removed from the first liner and is applied to a second liner, wherein, in each case a distance a is between the second or third adhesive tape strips,
    in each case a cut is made through each of the first liner and the second liner, between the adhesive tape strips located on the first liner and on the second liner,
    the individual adhesive tape strips are wound up with the first and second liners to give a total of X rolls in a form of an Archimedean spiral.

2. The process according to claim 1, wherein the cut through the first and second liners is made in such a way that the distance a between the second adhesive tape strips and/or the third adhesive tape strips is in each case precisely bisected.

3. The process according to claim 1, wherein in each case the liners are separated directly at a lateral edge of the second adhesive tape strips and/or the third adhesive tape strips.

4. The process according to claim 1, wherein the adhesive tape web is (i) an adhesive mass layer without any other components, (ii) a backing material equipped on one side with an adhesive mass, or (iii) a backing material equipped on both sides with an adhesive mass.

5. The process according to claim 1, wherein the process is carried out continuously.

6. The process according to claim 1, wherein the adhesive tape web is a layer composed of one, two or more adhesive mass layers.

* * * * *